(12) United States Patent  
Zhong et al.

(10) Patent No.: US 10,904,707 B2
(45) Date of Patent: Jan. 26, 2021

(54) LOCATION-BASED SERVICE IMPLEMENTING METHOD AND APPARATUS

(71) Applicant: Advanced New Technologies Co., Ltd., George Town (KY)

(72) Inventors: Guanhai Zhong, Shanghai (CN); Hui Li, Shanghai (CN)

(73) Assignee: Advanced New Technologies Co., Ltd., Grand Caymen (KY)

( * ) Notice: Subject to any disclaimer, the term of this patent is extended or adjusted under 35 U.S.C. 154(b) by 0 days.

(21) Appl. No.: 16/579,335

(22) Filed: Sep. 23, 2019

(65) Prior Publication Data

US 2020/0120449 A1     Apr. 16, 2020

Related U.S. Application Data

(63) Continuation of application No. 16/115,204, filed on Aug. 28, 2018, now Pat. No. 10,425,770, which is a (Continued)

(30) Foreign Application Priority Data

Feb. 29, 2016   (CN) .......................... 2016 1 0113493

(51) Int. Cl.
*H04W 4/029*      (2018.01)
*G06F 16/901*     (2019.01)
(Continued)

(52) U.S. Cl.
CPC ........ *H04W 4/029* (2018.02); *G06F 16/9014* (2019.01); *H04L 29/08* (2013.01);
(Continued)

(58) Field of Classification Search
CPC .......................... H04W 4/029; G06Q 30/0261
See application file for complete search history.

(56) References Cited

U.S. PATENT DOCUMENTS 10,425,770 B2      9/2019 Zhong et al.
2013/0054647 A1*   2/2013 Terauchi ............ G06Q 30/0261
                                         707/780
(Continued)

FOREIGN PATENT DOCUMENTS

CN       1604147       4/2005
CN       102102992     6/2011
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Myron Wyche
(74) *Attorney, Agent, or Firm* — Fish & Richardson P.C.

(57) ABSTRACT

A request is received for a service from an application of a mobile computing device. A latitude and a longitude of a geographic location associated with the mobile computing device is determined. The geographic location is mapped to a corresponding location on an embedded map associated with the application, where the embedded map is divided into a plurality of level 1 grids. A level 1 grid is determined in which the corresponding location is located. A granularity corresponding to a geographic distance is determined. The granularity is converted into a corresponding step size on the embedded map. The level 1 grid is divided into a plurality of level 2 grids based on the corresponding step size.

19 Claims, 9 Drawing Sheets

Related U.S. Application Data continuation of application No. PCT/CN2017/073915, filed on Feb. 17, 2017.

(51) Int. Cl.
 *H04L 29/08* (2006.01)
 *H04W 4/021* (2018.01)
 *H04W 4/02* (2018.01)

(52) U.S. Cl.
 CPC .............. *H04L 67/18* (2013.01); *H04W 4/021* (2013.01); *H04W 4/025* (2013.01)

(56) References Cited

U.S. PATENT DOCUMENTS

| | | |
|---|---|---|
| 2013/0097163 A1 | 4/2013 | Oikarinen et al. |
| 2015/0120772 A1 | 4/2015 | Cui et al. |
| 2015/0264523 A1 | 9/2015 | Xu et al. |
| 2015/0281903 A1 | 10/2015 | Lv et al. |
| 2016/0037480 A1 | 2/2016 | Bellamkonda et al. |
| 2018/0367955 A1 | 12/2018 | Zhong et al. |

FOREIGN PATENT DOCUMENTS

| | | |
|---|---|---|
| CN | 20120100085 | 9/2012 |
| CN | 103338509 | 10/2013 |
| CN | 103927933 | 7/2014 |
| CN | 105260468 | 1/2016 |
| JP | 2002358004 | 12/2002 |
| JP | 2013045319 | 3/2013 |
| KR | 20120100085 | 9/2012 |
| WO | WO 2014170646 | 10/2014 |

OTHER PUBLICATIONS

European Extended Search Report in European Application No. 17759127.8, dated Jan. 24, 2019, 9 pages.
International Search Report issued by the International Searching Authority in International Application No. PCT/CN2017/073915 dated May 8, 2017; 10 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/073915, dated Sep. 4, 2018, 9 pages (with English Translation).
PCT Written Opinion of the International Searching Authority in international Application No. PCT/CN2017/073915, dated May 8, 2017, 8 pages (with English translation).

* cited by examiner

|   |   |   |
|---|---|---|
| 1 | 2 | 3 |
| 4 |   | 5 |
| 6 | 7 | 8 |

FIG. 6

LOCATION-BASED SERVICE IMPLEMENTING METHOD AND APPARATUS

CROSS-REFERENCE TO RELATED APPLICATIONS

This application is a continuation of U.S. patent application Ser. No. 16/115,204, filed on Aug. 28, 2018, which is a continuation of PCT Application No. PCT/CN2017/073915, filed on Feb. 17, 2017, which claims priority to Chinese Patent Application No. 201610113493.9, filed on Feb. 29, 2016, and each application is hereby incorporated by reference in its entirety.

TECHNICAL FIELD

The present disclosure relates to the field of communications technologies, and in particular, to a location-based service implementing method and apparatus.

BACKGROUND

With the rapid development of Internet technologies, a growing number of service providers provide users with geographic location-based services, such as searching for a nearby restaurant or parking lot based on a current location.

In related technologies, when the geographic location-based service is provided, a region that a requesting location belongs to is usually first determined based on a GeoHash algorithm(s), and then a service needed by the user is searched for based on the determined region. However, in the GeoHash algorithm, a latitude and a longitude are encoded through a dichotomic search, and the sizes of the regions with different encoded latitudes are different. Because the size of a low-latitude region is greater than the size of a high-latitude region, considerable processing resources of a server are wasted when processing a service in the low-latitude region.

SUMMARY

In view of this, the present disclosure provides a location-based service implementing method and apparatus.

Specifically, the present disclosure is implemented by using the technical solutions below.

A location-based service implementing method is provided, where the method includes: determining, based on a requesting location in a service request, a level-1 region that the service request belongs to; dividing the level-1 region into a plurality of level-2 regions based on predetermined granularity; determining, based on the requesting location, a level-2 region that the service request belongs to; and responding to the service request based on location information of all service objects in the level-2 region that the service request belongs to and an adjacent level-2 region.

Optionally, the dividing the level-1 region into a plurality of level-2 regions based on predetermined granularity includes: determining a reference location in the level-1 region; reaching an offset location by performing shifting in a predetermined direction by the granularity based on the reference location, and obtaining offset coordinate information of the offset location; calculating a change value between reference coordinate information of the reference location and the offset coordinate information; determining a size of the level-2 region based on the change value; and dividing, based on the size of the level-2 region, the level-1 region that the service request belongs to into a plurality of level-2 regions.

Optionally, the determining a reference location in the level-1 region includes: when the level-1 region is in the Northern Hemisphere, determining a northeast corner or a northwest corner of the level-1 region as the reference location; or when the level-1 region is in the Southern Hemisphere, determining a southeast corner or a southwest corner of the level-1 region as the reference location.

Optionally, the reaching an offset location by performing shifting in a predetermined direction by the granularity based on the reference location includes: when the reference location is the northeast corner of the level-1 region, separately performing shifting westwards and southwards by the granularity based on the northeast corner, to reach the offset location; when the reference location is the northwest corner of the level-1 region, separately performing shifting eastwards and southwards by the granularity based on the northwest corner, to reach the offset location; when the reference location is the southeast corner of the level-1 region, separately performing shifting westwards and northwards by the granularity based on the southeast corner, to reach the offset location; or when the reference location is the southwest corner of the level-1 region, separately performing shifting eastwards and northwards by the granularity based on the southwest corner, to reach the offset location.

Optionally, the responding to the service request based on location information of all service objects in the level-2 region that the service request belongs to and an adjacent level-2 region includes: obtaining the location information of all the service objects in the level-2 region that the service request belongs to and the adjacent level-2 region; calculating a distance between each service object and the requesting location based on the location information of the service object; and pushing a service object with a distance satisfying a predetermined condition as a response to the service request.

A location-based service implementing apparatus is provided, where the apparatus includes: a first determining unit, configured to determine, based on a requesting location in a service request, a level-1 region that the service request belongs to; a division unit, configured to divide the level-1 region into a plurality of level-2 regions based on predetermined granularity; a second determining unit, configured to determine, based on the requesting location, a level-2 region that the service request belongs to; and a service response unit, configured to respond to the service request based on location information of all service objects in the level-2 region that the service request belongs to and an adjacent level-2 region.

Optionally, the division unit includes: a reference determining subunit, configured to determine a reference location in the level-1 region; a granularity shifting subunit, configured to: reach an offset location by performing shifting in a predetermined direction by the granularity based on the reference location, and obtain offset coordinate information of the offset location; a change value calculation subunit, configured to calculate a change value between reference coordinate information of the reference location and the offset coordinate information; a size determining subunit, configured to determine a size of the level-2 region based on the change value; and a region division subunit, configured to divide, based on the size of the level-2 region, the level-1 region that the service request belongs to into a plurality of level-2 regions.

Optionally, the reference determining subunit is configured to: when the level-1 region is in the Northern Hemisphere, determine a northeast corner or a northwest corner of the level-1 region as the reference location; or when the level-1 region is in the Southern Hemisphere, determine a southeast corner or a southwest corner of the level-1 region as the reference location.

Optionally, the granularity shifting subunit is configured to: when the reference location is the northeast corner of the level-1 region, separately perform shifting westwards and southwards by the granularity based on the northeast corner, to reach the offset location; when the reference location is the northwest corner of the level-1 region, separately perform shifting eastwards and southwards by the granularity based on the northwest corner, to reach the offset location; when the reference location is the southeast corner of the level-1 region, separately perform shifting westwards and northwards by the granularity based on the southeast corner, to reach the offset location; or when the reference location is the southwest corner of the level-1 region, separately perform shifting eastwards and northwards by the granularity based on the southwest corner, to reach the offset location.

Optionally, the service response unit is configured to: obtain the location information of all the service objects in the level-2 region that the service request belongs to and the adjacent level-2 region; calculate a distance between each service object and the requesting location based on the location information of the service object; and push a service object with a distance satisfying a predetermined condition as a response to the service request.

It can be learned from the previous descriptions that, during implementation of a location-based service in the present disclosure, the level-1 region that the service request belongs to can be determined based on the requesting location; the level-1 region is divided into a plurality of level-2 regions based on the predetermined granularity; and a response to the service request is based on the location information of all the service objects in the level-2 region that the service request belongs to and the adjacent level-2 region. Because all level-2 regions are of the same size, processing a service in a low-latitude region can save processing resources of a server, and improve performance of the server.

BRIEF DESCRIPTION OF DRAWINGS

FIG. 6 is a schematic diagram illustrating a level-2 region adjacent to a level-2 region that a service request belongs to, according to an implementation of the present disclosure.

DESCRIPTION OF IMPLEMENTATIONS

Implementations are described in detail here, and examples of the implementations are presented in the accompanying drawings. When the following descriptions relate to the accompanying drawings, unless otherwise specified, same numbers in different accompanying drawings represent same or similar elements. Implementations described in the following implementations do not represent all implementations in accordance with the present disclosure. Instead, they are only examples of apparatuses and methods in accordance with some aspects of the present disclosure that are described in detail in the appended claims.

The terms used in the present disclosure are merely for illustrating specific implementations, and are not intended to limit the present disclosure. The terms "a", "said", and "the" of singular forms used in the present disclosure and the appended claims are also intended to include plural forms, unless otherwise specified in the context clearly. It should also be understood that, the term "and/or" used in this specification indicates and includes any or all possible combinations of one or more associated listed items.

It should be understood that although terms "first", "second", "third", etc. may be used in the present disclosure to describe various types of information, the information is not limited to the terms. These terms are only used to differentiate information of a same type. For example, without departing from the scope of the present disclosure, first information may also be referred to as second information, and similarly, the second information may be referred to as the first information. Depending on the context, for example, the word "if" used here may be explained as "while", "when", or "in response to determining".

Figure 1:
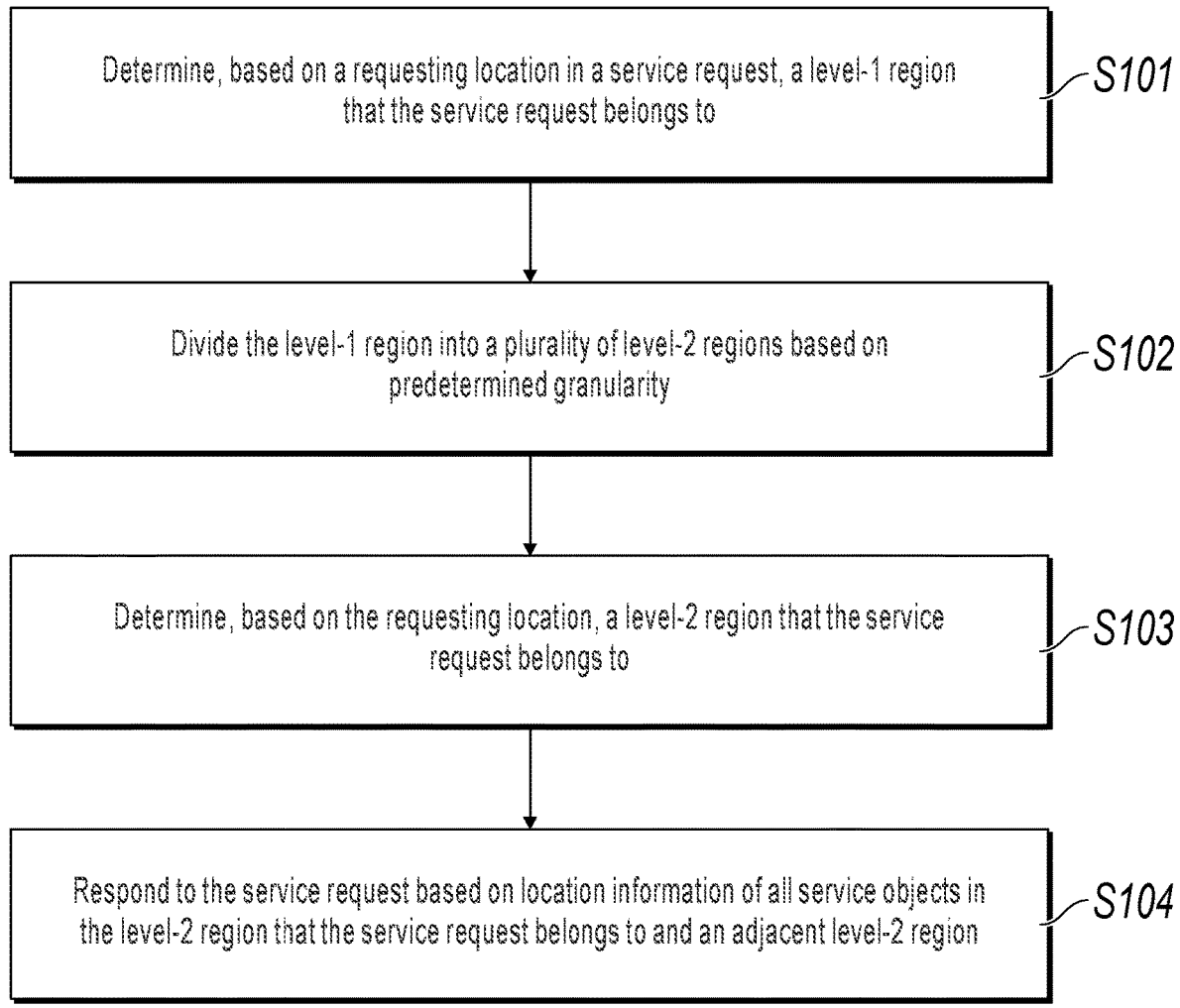
FIG. 1 is a flowchart illustrating a location-based service implementing method, according to an implementation of the present disclosure.

FIG. 1 is a flowchart illustrating a location-based service implementing method, according to an implementation of the present disclosure.

Referring to FIG. 1, the location-based service implementing method can be applied to a server, and includes the steps below.

Step 101: Determine, based on a requesting location in a service request, a level-1 region that the service request belongs to.

In this implementation, the service request is a request for obtaining a service object based on a location, and the service object includes a service provider, a service provided by the service provider, etc. The service request is usually initiated by a user, for example, the service request can be a request for searching for a restaurant, a parking lot, etc. near a current location.

In this implementation, the level-1 region is usually divided by a developer in advance, for example, the developer can divide continent areas on the earth into a plurality of level-1 regions based on a predetermined size. The Chinese mainland is used as an example. The developer can divide the Chinese mainland into a plurality of level-1 regions based on a size of 0.5°×0.5° (longitude×latitude).

Figure 2:
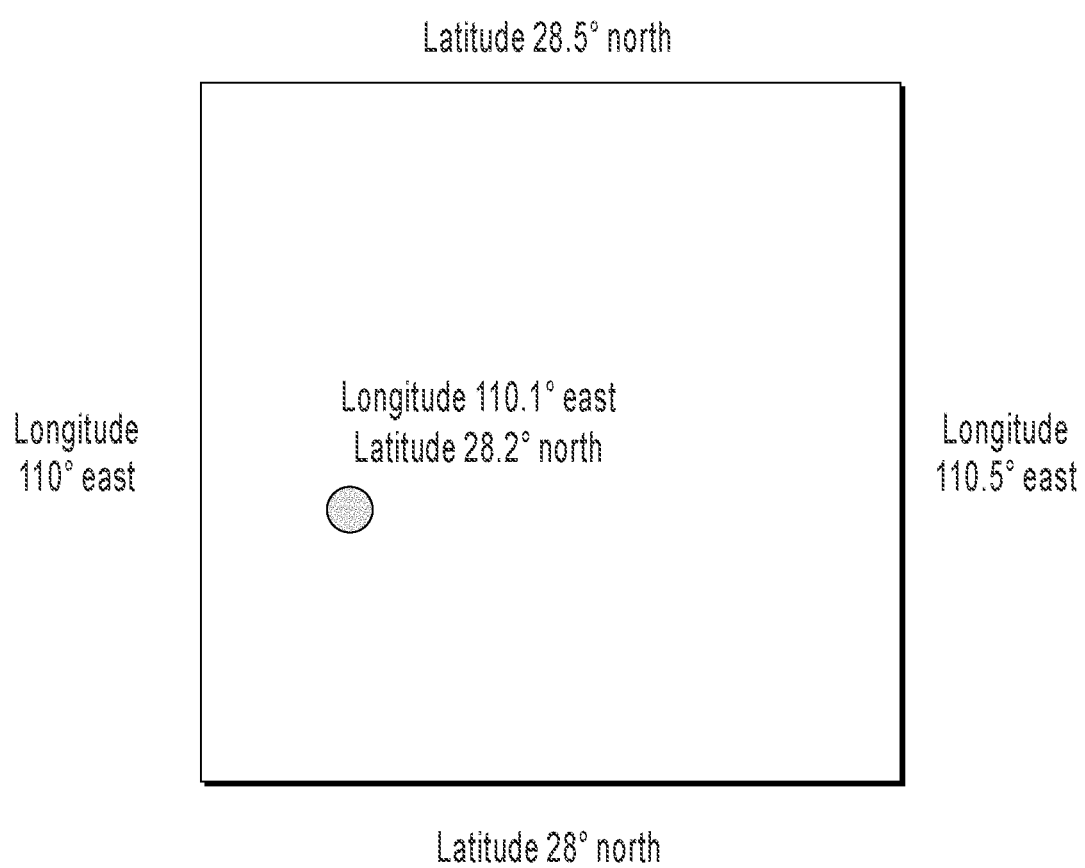
FIG. 2 is a schematic diagram illustrating a level-1 region, according to an implementation of the present disclosure.

In this implementation, after the service request is received, the requesting location included in the service request can be obtained, and the level-1 region that the service request belongs to is determined based on the requesting location. The requesting location is usually represented in a form of latitude and longitude coordinates. For example, assuming that the Chinese mainland is divided into a plurality of level-1 regions based on a size of 0.5°×0.5° (longitude×latitude), and the requesting location lies at longitude 110.1° east and latitude 28.2° north, in this step, referring to FIG. 2, it can be determined that the service request belongs to a level-1 region whose southwest coordinates are longitude 110° east and latitude 28° north and northeast coordinates are longitude 110.5° east and latitude 28.5° north.

Step 102: Divide the level-1 region into a plurality of level-2 regions based on predetermined granularity.

In this implementation, the predetermined granularity can be set by the developer. For example, the developer can set the predetermined granularity to, for example, 50 meters or 100 meters based on a requirement for service granularity in actual disclosure. No limitation is imposed in the present disclosure.

Figure 3:
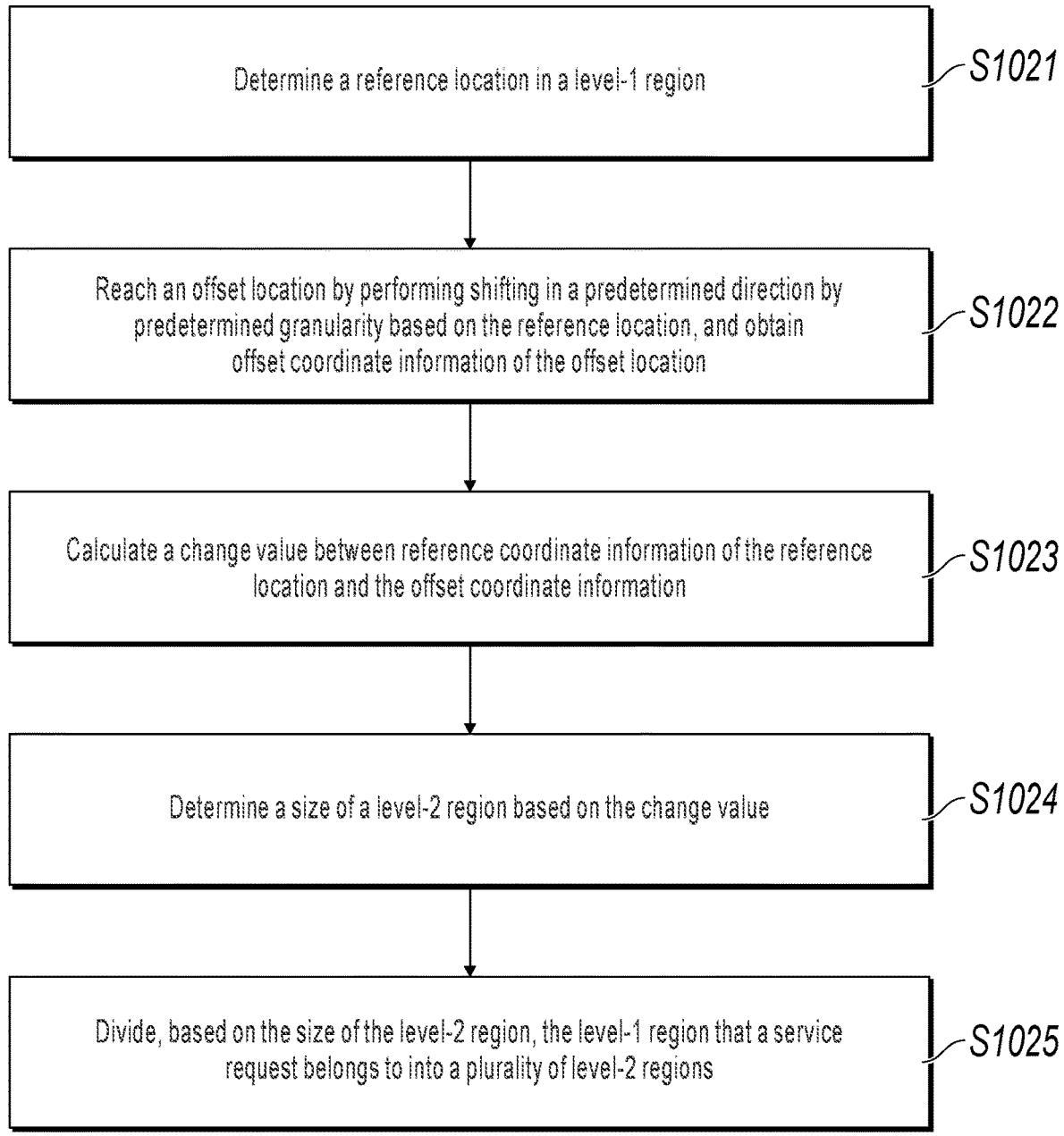
FIG. 3 is a flowchart illustrating division of a level-1 region into a plurality of level-2 regions, according to an implementation of the present disclosure.

Based on step 101, after the level-1 region that the service request belongs to is determined, the level-1 region can be divided into a plurality of level-2 regions based on the predetermined granularity. Referring to FIG. 3, the dividing the level-1 region into a plurality of level-2 regions can include the steps below.

Step 1021: Determine a reference location in the level-1 region.

In this implementation, the sizes of actual geographic regions mapped from different latitudes are different, for example, the size of an actual region that is mapped from changing latitude by one degree in a high-latitude region is smaller than the size in a low-latitude region. Therefore, in this step, the reference location can be determined based on a latitude of the level-1 region that the service request belongs to.

In one example, when the level-1 region is located in the Northern Hemisphere, a higher-latitude location in the level-1 region can be determined as the reference location, for example, a northeast corner or a northwest corner of the level-1 region can be determined as the reference location. In another example, when the level-1 region is located in the Southern Hemisphere, a higher-latitude location in the level-1 region can also be determined as the reference location, for example, a southeast corner or a southwest corner of the level-1 region can be determined as the reference location.

Step 1022: Reach an offset location by performing shifting in a predetermined direction by the predetermined granularity based on the reference location, and obtain offset coordinate information of the offset location.

Figure 4:
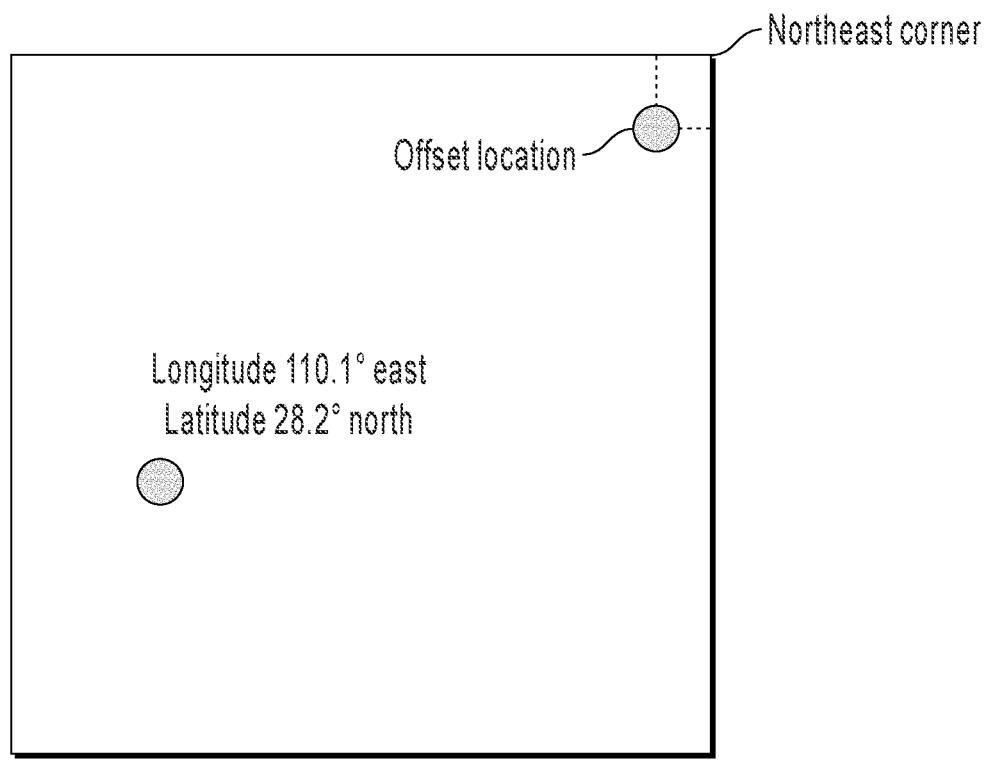
FIG. 4 is a schematic diagram illustrating location shifting, according to an implementation of the present disclosure.

In this implementation, shifting can be performed in a low-latitude direction based on the reference location. For example, referring to FIG. 4, when the reference location is the northeast corner of the level-1 region, shifting can be separately performed westwards and southwards by the granularity based on the northeast corner, and a location reached after the shifting is referred to as the offset location. Similarly, when the reference location is the northwest corner of the level-1 region, shifting can be separately performed eastwards and southwards by the granularity based on the northwest corner, to reach the offset location. When the reference location is the southeast corner of the level-1 region, shifting can be separately performed westwards and northwards by the granularity based on the southeast corner, to reach the offset location. When the reference location is the southwest corner of the level-1 region, shifting can be separately performed eastwards and northwards by the granularity based on the southwest corner, to reach the offset location.

In this step, after the offset location is reached, coordinate information of the offset location can be obtained. For ease of distinguishing, the coordinate information of the offset location can be referred to as offset coordinate information. Usually, the offset coordinate information can also be represented in a form of latitude and longitude coordinates.

Step 1023: Calculate a change value between reference coordinate information of the reference location and the offset coordinate information.

Based on step 1022, after the offset coordinate information of the offset location is obtained, the change value between the reference coordinate information and the offset coordinate information can be calculated. For example, a difference between latitude and longitude coordinate values of the reference location and latitude and longitude coordinate values of the offset location is calculated.

Step 1024: Determine a size of the level-2 region based on the change value.

In this implementation, assuming that the longitude difference between the reference location and the offset location is x, and the latitude difference between the reference location and the offset location is y, x and y can be determined as a length and a width of the level-2 region.

Step 1025: Divide, based on the size of the level-2 region, the level-1 region that the service request belongs to into a plurality of level-2 regions.

Based on step 1024, after the size of the level-2 region is determined, the level-1 region that the service request belongs to can be divided into a plurality of level-2 regions based on the determined size. For example, the level-1 region can be divided into a plurality of level-2 regions along a boundary of the level-1 region starting from the northeast corner of the level-1 region.

It should be noted that, when division is performed to obtain the level-2 region, division can be performed starting from any corner of the level-1 region, for example, the southeast corner, the northwest corner, or the southwest corner. No limitation is imposed in the present disclosure. In addition, when the level-1 region is divided into a plurality of level-2 regions, the plurality of level-2 regions obtained through division can cover the level-1 region, that is, the sum of each size of the level-2 region obtained through division is usually greater than or equal to the size of the level-1 region. When the sum of each size of the level-2 region obtained through division is equal to the size of the level-1 region, it indicates that the level-1 region is divided into a plurality of level-2 regions of the same size.

Step 103: Determine, based on the requesting location, a level-2 region that the service request belongs to.

Based on step 102, after the level-1 region that the service request belongs to is divided into a plurality of level-2 regions, the level-2 region that the service request belongs to can be determined based on the requesting location.

Step 104: Respond to the service request based on location information of all service objects in the level-2 region that the service request belongs to and an adjacent level-2 region.

Figure 5:
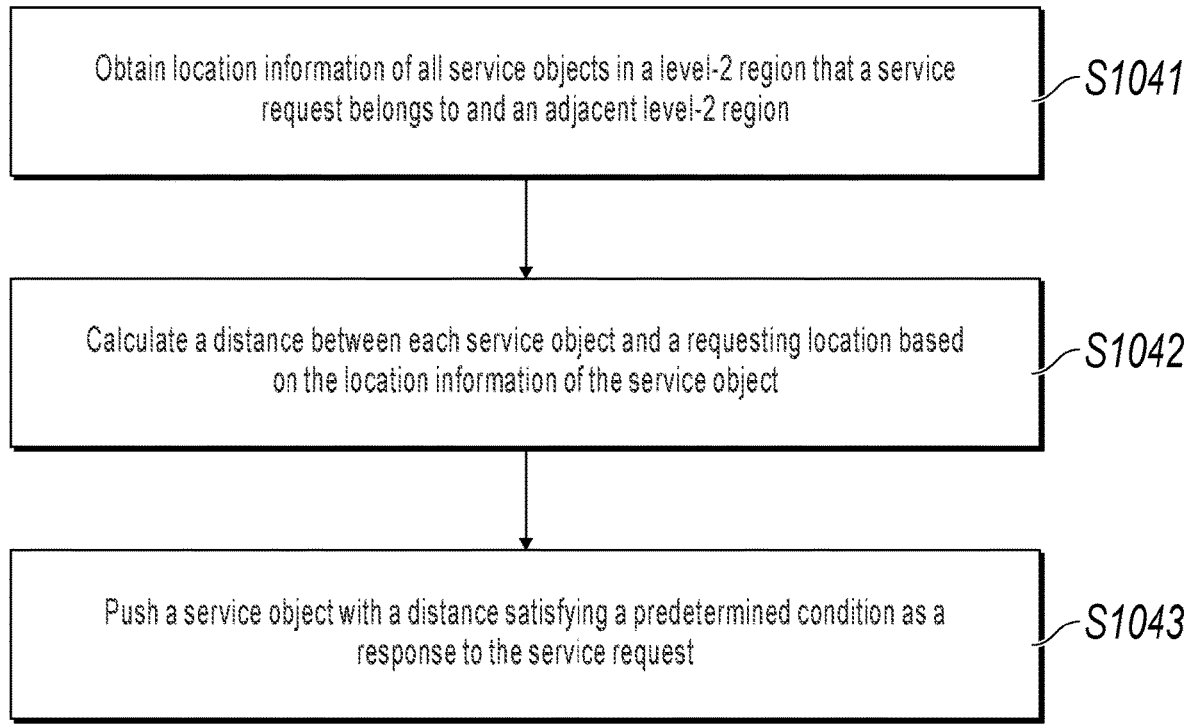
FIG. 5 is a flowchart illustrating responding to a service request, according to an implementation of the present disclosure.

Based on step 103, after the level-2 region that the service request belongs to is determined, referring to FIG. 5, a response to the service request can be based on the following steps.

Step 1041: Obtain the location information of all the service objects in the level-2 region that the service request belongs to and the adjacent level-2 region.

Figure 6:
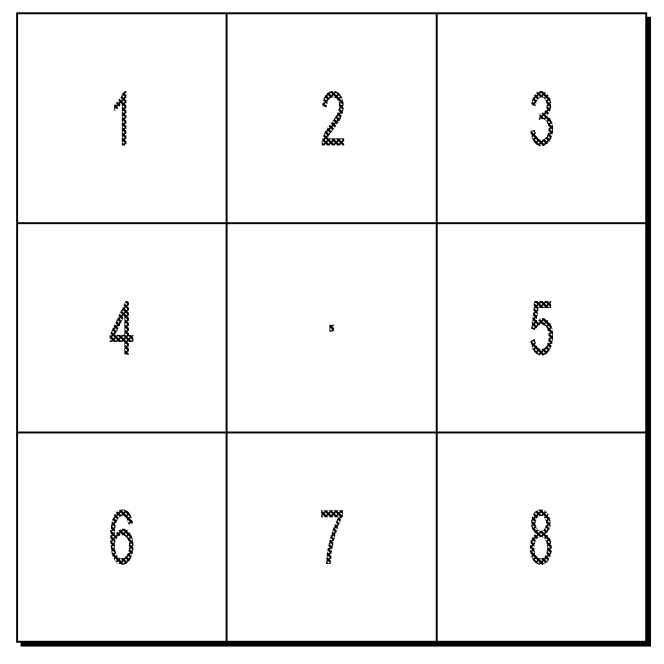

In this implementation, after the level-2 region that the service request belongs to is determined, eight level-2 regions adjacent to the level-2 region can be determined. Referring to FIG. 6, assuming that a rectangular region located in the center is the level-2 region that the service request belongs to, eight level-2 regions that are numbered from 1 to 8 around the level-2 region are level-2 regions adjacent to the level-2 region. In this step, location information of all service objects in the level-2 region that the service request belongs to and the eight level-2 regions adjacent to the level-2 region can be obtained.

For example, assuming that the service request is a service request for searching for a restaurant near the current location, location information of all restaurants in the level-2 region that the service request belongs to and the eight level-2 regions adjacent to the level-2 region can be obtained.

Step 1042: Calculate a distance between each service object and the requesting location based on the location information of the service object.

Based on step 1041, after the location information of each service object is obtained, the distance between the service object and the requesting location can be calculated based on the location information. The service request for searching for a restaurant near the current location is still used as an example. A distance between each restaurant and the requesting location can be calculated based on the obtained location information of the restaurants.

Step 1043: Push a service object with a distance satisfying a predetermined condition as a response to the service request.

Based on step 1042, after the distance between each service object and the requesting location is calculated, the service object with a distance satisfying the predetermined condition can be pushed to the user initiating the service request as the response to the service request.

In this implementation, the predetermined condition is usually a distance condition, which can be set by the developer, or can be customized by the user initiating the service request. Assuming that the service request is a request for searching for a nearby restaurant, the user can customize a distance of searching for the restaurant, for example, 200 meters or 500 meters, and the predetermined condition is as follows: the distance is less than 200 meters or 500 meters. If the user does not customize the distance, a default distance set by the developer can be used, for example, 300 meters.

It can be learned from the previous descriptions that, during implementation of a location-based service in the present disclosure, the level-1 region that the service request belongs to can be determined based on the requesting location; the level-1 region is divided into a plurality of level-2 regions based on the predetermined granularity; and a response to the service request is based on the location information of all the service objects in the level-2 region that the service request belongs to and the adjacent level-2 region. Because all level-2 regions are of the same size, processing a service in a low-latitude region can save processing resources of a server, and improve performance of the server.

Corresponding to the previous implementation of the location-based service implementing method, the present disclosure further provides an implementation of a location-based service implementing apparatus.

Figure 7:
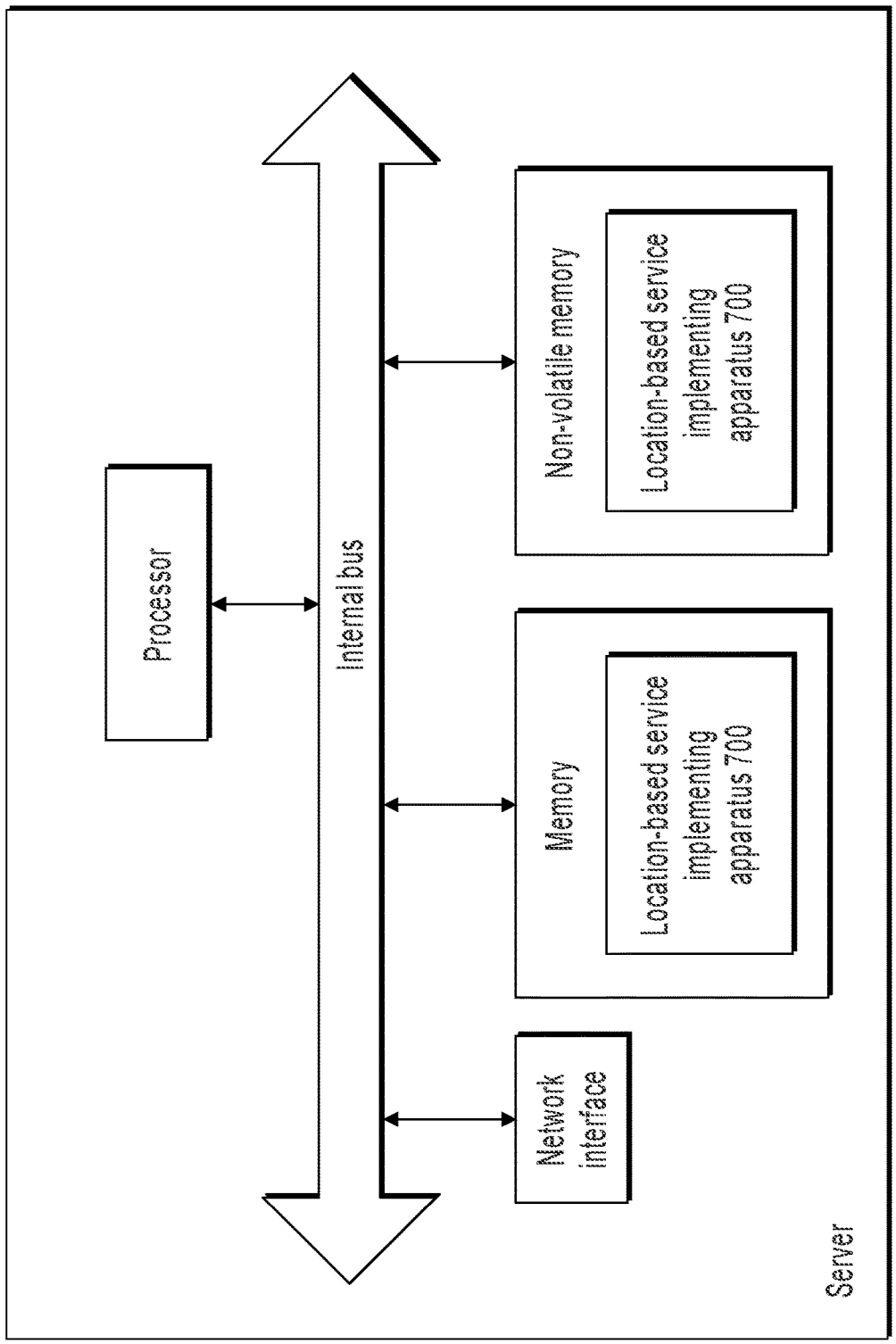
FIG. 7 is a schematic structural diagram illustrating a location-based service implementing apparatus, according to an implementation of the present disclosure.

The implementation of the location-based service implementing apparatus in the present disclosure can be applied to a server. The apparatus implementation can be implemented by software, hardware, or a combination of hardware and software. Software implementation is used as an example. As a logical apparatus, the software is formed by reading a corresponding computer program instruction in a non-volatile memory and running the instruction in a memory by a processor in a server of the apparatus. In terms of hardware, referring to FIG. 7, FIG. 7 is a hardware structural diagram illustrating a server of a location-based service implementing apparatus in the present disclosure. In addition to a processor, a memory, a network interface, and a non-volatile memory shown in FIG. 7, the server of the apparatus in the implementations can usually include other hardware based on an actual function of the server. Details are not described.

Figure 8:
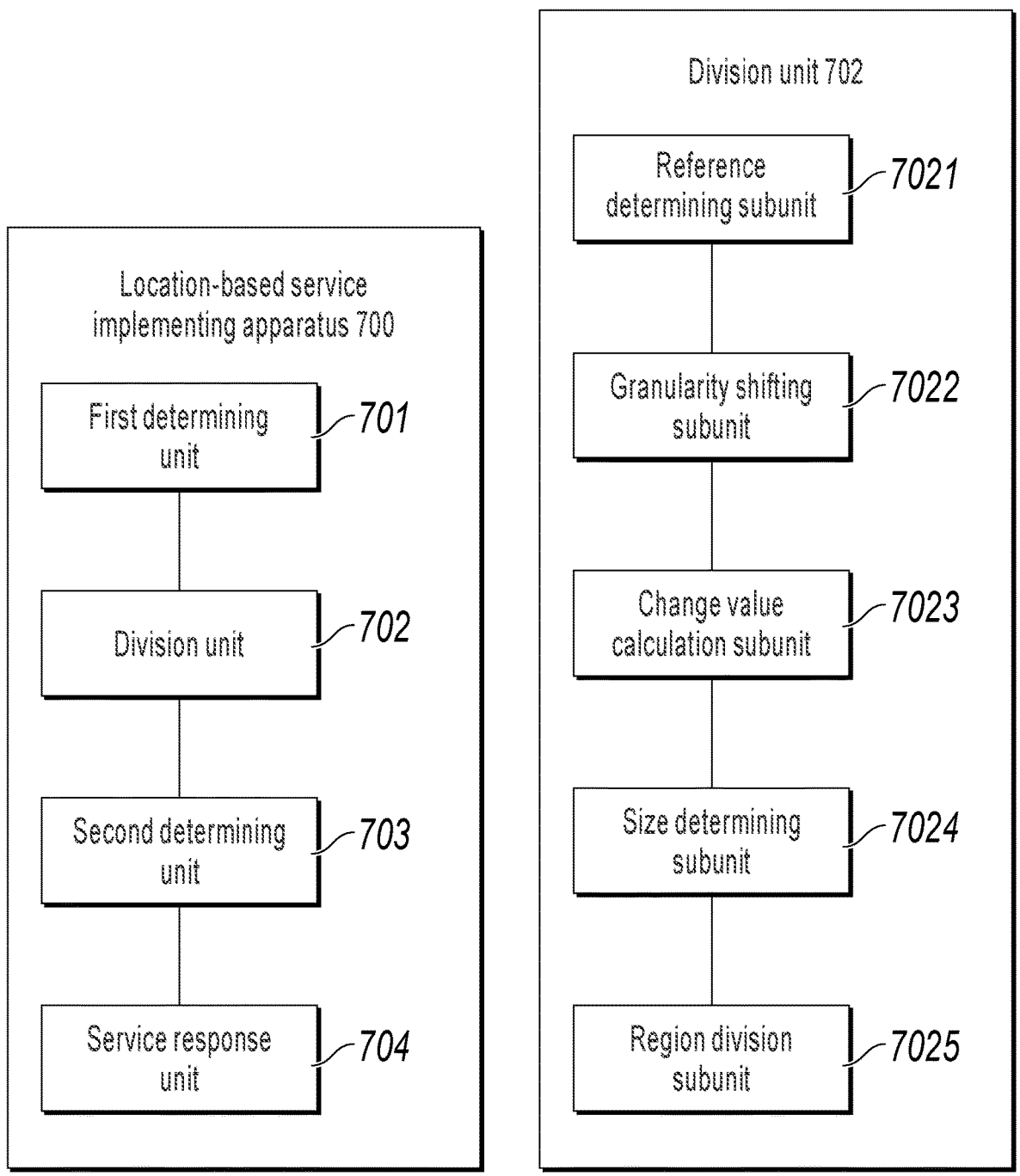
FIG. 8 is a schematic structural diagram illustrating a location-based service implementing apparatus, according to an implementation of the present disclosure.

FIG. 8 is a schematic structural diagram illustrating a location-based service implementing apparatus, according to an implementation of the present disclosure.

Referring to FIG. 8, a location-based service implementing apparatus 700 can be applied to the server shown in FIG. 7, and the implementing apparatus 700 includes a first determining unit 701, a division unit 702, a second determining unit 703, and a service response unit 704. The division unit 702 can include a reference determining subunit 7021, a granularity shifting subunit 7022, a change calculation subunit 7023, a size determining subunit 7024, and a region division subunit 7025.

The first determining unit 701 is configured to determine, based on a requesting location in a service request, a level-1 region that the service request belongs to.

The division unit 702 is configured to divide the level-1 region into a plurality of level-2 regions based on predetermined granularity.

The second determining unit 703 is configured to determine, based on the requesting location, a level-2 region that the service request belongs to.

The service response unit 704 is configured to respond to the service request based on location information of all service objects in the level-2 region that the service request belongs to and an adjacent level-2 region.

The reference determining subunit 7021 is configured to determine a reference location in the level-1 region.

The granularity shifting subunit 7022 is configured to: reach an offset location by performing shifting in a predetermined direction by the granularity based on the reference location, and obtain offset coordinate information of the offset location.

The change value calculation subunit 7023 is configured to calculate a change value between reference coordinate information of the reference location and the offset coordinate information.

The size determining subunit 7024 is configured to determine a size of the level-2 region based on the change value.

The region division subunit 7025 is configured to divide, based on the size of the level-2 region, the level-1 region that the service request belongs to into a plurality of level-2 regions.

Optionally, the reference determining subunit 7021 is configured to: when the level-1 region is in the Northern Hemisphere, determine a northeast corner or a northwest corner of the level-1 region as the reference location; or when the level-1 region is in the Southern Hemisphere, determine a southeast corner or a southwest corner of the level-1 region as the reference location.

Optionally, the granularity shifting subunit 7022 is configured to: when the reference location is the northeast corner of the level-1 region, separately perform shifting westwards and southwards by the granularity based on the northeast corner, to reach the offset location; when the reference location is the northwest corner of the level-1 region, separately perform shifting eastwards and southwards by the granularity based on the northwest corner, to reach the offset location; when the reference location is the southeast corner of the level-1 region, separately perform shifting westwards and northwards by the granularity based on the southeast corner, to reach the offset location; or when the reference location is the southwest corner of the level-1 region, separately perform shifting eastwards and northwards by the granularity based on the southwest corner, to reach the offset location.

Optionally, the service response unit 704 is configured to: obtain the location information of all the service objects in the level-2 region that the service request belongs to and the adjacent level-2 region; calculate a distance between each service object and the requesting location based on the location information of the service object; and push a service object with a distance satisfying a predetermined condition as a response to the service request.

For an implementation process of functions and roles of each unit in the apparatus, refer to an implementation process of corresponding steps in the previous method. Details are not described here again.

Because an apparatus implementation basically corresponds to a method implementation, for related parts, refer to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules or units may be selected according to actual needs to achieve the objectives of the solutions in the present disclosure. A person of ordinary skill in the art may understand and implement the present disclosure without creative efforts.

The previous descriptions are merely implementations of the present disclosure, and are not intended to limit the present disclosure. Any modifications, equivalent replacements, or improvements made without departing from the spirit and principle of the present disclosure shall fall within the protection scope of the present disclosure.

Figure 9:
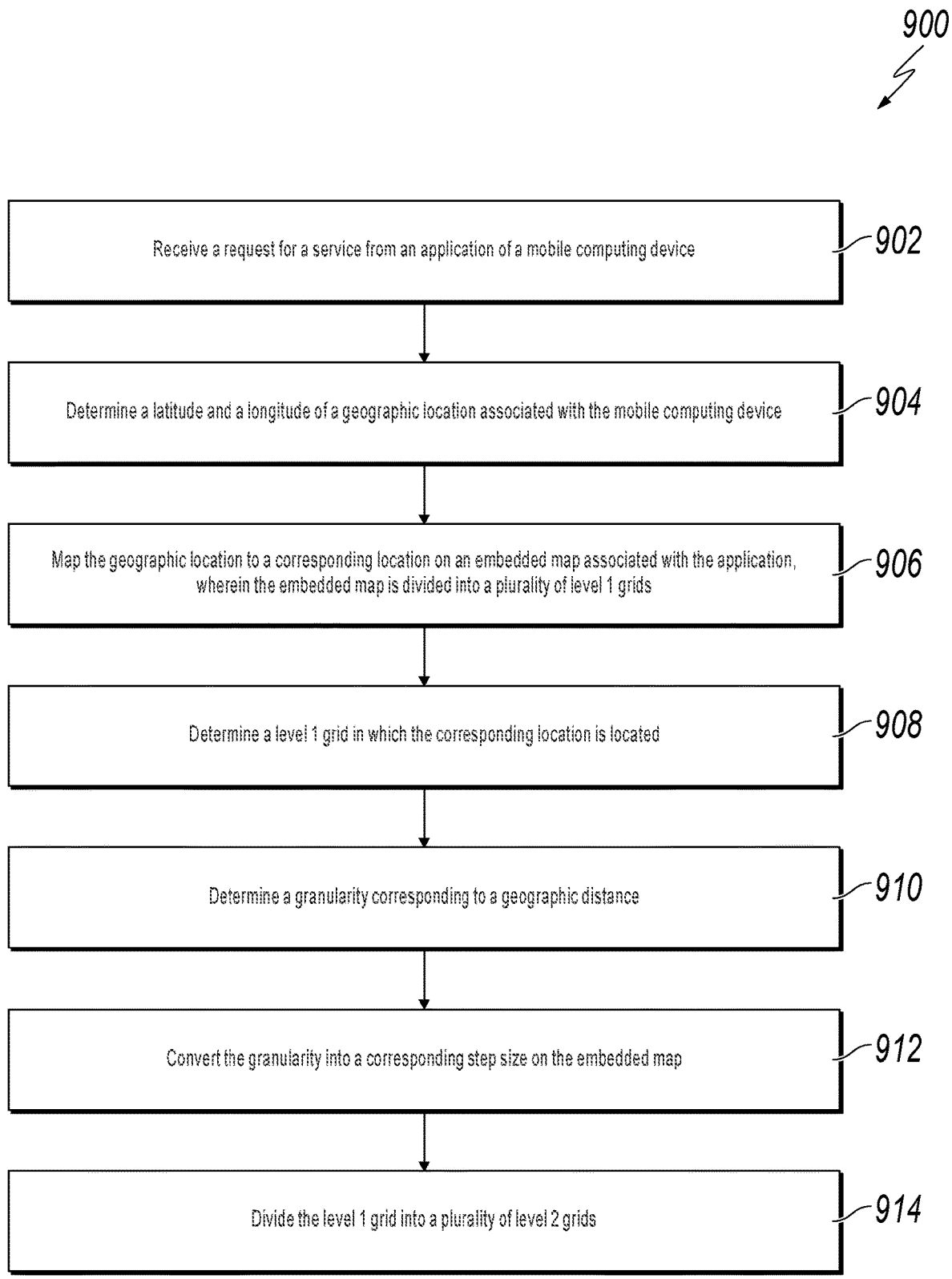
FIG. 9 is a flowchart illustrating an example of a computer-implemented method for performing a location-based service, according to an implementation of the present disclosure.

FIG. 9 is a flowchart illustrating an example of a computer-implemented method 900 for performing a location-based service, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a request for a service is received from an application of a mobile computing device. In some implementations, the service can be a lifestyle-type service, such as services associated with restaurants, banks, hospitals, and stores. Other services consistent with this disclosure are also considered to be within the scope of the disclosure. In some implementations, the request can be made from a mobile computing device to search for nearby providers of the service. The request can be processed by one or more servers associated with the application or that are performing the service. From 902, method 900 proceeds to 904.

At 904, a latitude and a longitude of a geographic location of the mobile computing device is determined. In some cases, the latitude and longitude of the geographic location can be determined using a GPS function (for example, provided by hardware, software, or both hardware or software) embedded in or executing on the mobile computing device. From 904, method 900 proceeds to 906.

At 906, the geographic location is mapped to a corresponding location on an embedded map associated with the application (for example, the application can include the embedded map). In some implementations, the embedded map is divided into a plurality of level 1 grids. In some implementations, the coordinates of locations on the embedded map can be encoded based on a GeoHash algorithm(s). For example, binary encoding can be performed to encode the latitude and the longitude of the geographic location to a binary code based on a binary search. The GeoHash algorithm(s) can be used to convert the binary encoded latitude and longitude to a GeoHash encoded, alphanumeric string. The alphanumeric string can be used to express latitude or longitude and identify the corresponding location of the mobile computing device on the embedded map.

In some implementations, the embedded map can be divided into one or more grids. In some cases, the grids can be defined by latitude and longitude values. For example, a grid can cover an area that spans half a latitude and half a longitude, such as from 21 to 21.5 degrees north latitude and from 55 to 55.5 degrees east longitude. The example grids are relatively large and can be considered as level 1 grids. Level 1 grids that have higher latitude values can be smaller than level 1 grids with lower latitude values. The search area of service providers in lower-latitude-value grids are larger than search area of service providers in higher-latitude-value grids. From 906, method 900 proceeds to 908.

At 908, a level 1 grid in which the corresponding location is located is determined. As discussed earlier, each grid has a starting latitude (for example, 21 degrees north), an ending latitude (for example, 21.5 degrees north), a starting longitude (for example, 55 degrees east), and an ending longitude (for example, 55.5 degrees east). The location of the mobile device is determined to be located in a level 1 grid when its latitude and longitude are both located in the respective latitude and longitude range of the level 1 grid. From 908, method 900 proceeds to 910.

At 910, a granularity corresponding to a geographic distance is determined. In some implementations, the granularity can be a distance smaller than the side length of the level 1 grid. For example, the granularity can be 2 kilometers while the side length of the level 1 grid is measured in a half-degree of latitude and longitude. From 910, method 900 proceeds to 912.

At 912, the granularity is converted into a corresponding step size on the embedded map. In some implementations, the conversion can be performed based on the GeoHash algorithm(s) as previously discussed in 906. From 912, method 900 proceeds to 914.

At 914, the level 1 grid is divided into a plurality of level 2 grids based on the step size. In some implementations, the corresponding geographical side length of a level 2 grid is considered to be the granularity of the level 2 grid. In most cases, the granularity is smaller than side length of a level 1 grid in most of the populated geographical areas. Therefore, each level 1 grid can include a plurality of equally sized level 2 grids. In some implementations, the plurality of level 2 grids can completely overlap the level 1 grid. In some implementations, each of the level 2 grids can have a side length of the step size.

In some implementations, the level 2 grid in which the corresponding location of the mobile computing device is located can be determined. The determination can be performed similarly to determining the level 1 grid in which the corresponding location of the mobile device is located, as discussed in 908.

As an example, one or more providers of the requested service located in an area corresponding to a determined level 2 grid and eight level 2 grids surrounding the determined level 2 grid can be determined. Because the level 2 grids are evenly distributed as compared to level 1 grids where the grids are larger in lower-latitude-value regions and smaller in higher-latitude-value regions, the area searched can be substantially the same regardless of where the mobile computing device is located. Afterwards, information of at least a portion of the one or more service providers can be sent to the mobile computing device to be presented in the application (for example, on a computer display). At least a portion of the one or more service providers can be determined based on one or more predetermined conditions, such as distance, service type, or service speed. After 914, method 900 stops.

Implementations of the subject matter described in this specification can be implemented so as to realize particular advantages or technical effects. For example, because the level 2 grids are evenly divided as compared to level 1 grids where the grids are unevenly divided, the search area can be substantially the same regardless of where the mobile computing device is located. As such, resources of the server can be saved since substantially the same area size can be searched each time. Overall search performance of the server can also be improved with the described methodology.

The described methodology can ensure the efficient usage of computer resources (for example, processing cycles, network bandwidth, and memory usage), through the efficient division of geographic areas (for example, based on a GeoHash algorithm). At least these actions can minimize or prevent waste of available computer and network resources with respect to performing location-based services. Instead of searching service providers in a large level 1 grid area in lower-latitude-value regions and refining or filtering a search with one or more additional geographical conditions, the search can be more efficiently performed using a level 2 grid search to save computing resources and to improve user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A location-based service implementing method, wherein the method comprises:
   determining, based on a requesting location in a service request, a level-1 region that the service request belongs to, wherein the level-1 region is one of a first plurality of level-1 regions into which an area is divided based on a predetermined size in longitude and latitude;
   dividing the level-1 region into a second plurality of level-2 regions based on predetermined granularity, wherein the predetermined granularity is set to a predetermined geographical distance, and wherein the second plurality of level-2 regions are of a same size;
   determining, based on the requesting location, a level-2 region that the service request belongs to;
   determining a third plurality of adjacent level-2 regions that are adjacent to the level-2 region that the service request belongs to; and
   responding to the service request based on location information of all service objects in the level-2 region that the service request belongs to and on location information of all service objects in the third plurality of adjacent level-2 regions.

2. The method according to claim 1, wherein the dividing the level-1 region into a second plurality of level-2 regions based on predetermined granularity comprises:
   determining a reference location in the level-1 region in units of longitude and latitude, wherein the reference location is a corner of the level-1 region;
   determining an offset location that results from shifting the reference location of the level-1 region in directions of longitude and latitude into an interior of the level-1 region by a same granularity, and obtaining offset coordinate information in units of longitude and latitude of the offset location;
   calculating a change value between reference coordinate information of the reference location and the offset coordinate information, wherein the change value is a difference between latitude and longitude coordinate values of the reference location and latitude and longitude coordinate values of the offset coordinate information;
   determining a size of the level-2 region based on the change value; and
   dividing, based on the size of the level-2 region, the level-1 region that the service request belongs to into the second plurality of level-2 regions.

3. The method according to claim 1, wherein a sum of each size of the level-2 region obtained through division is equal to a size of the level-1 region.

4. The method according to claim 2, wherein calculating the change value between the reference coordinate information of the reference location and the offset coordinate information comprises:
   calculating a longitude difference x between the reference location and the offset location, and
   calculating a latitude difference y between the reference location and the offset location;
   and wherein determining a size of the level-2 region comprises determining a length of the level-2 region to be equal to x and a width of the level-2 region to be equal to y.

5. The method according to claim 2, wherein the determining a reference location in the level-1 region comprises:

when the level-1 region is in a northern hemisphere, determining a northeast corner or a northwest corner of the level-1 region as the reference location; or when the level-1 region is in a southern hemisphere, determining a southeast corner or a southwest corner of the level-1 region as the reference location.

6. The method according to claim 1, wherein the responding to the service request based on location information of all service objects in the level-2 region that the service request belongs to and an adjacent level-2 region comprises:
   obtaining the location information of all the service objects in the level-2 region that the service request belongs to and the location information of all service objects in the third plurality of adjacent level-2 regions;
   calculating a distance between each service object and the requesting location based on the location information of the service object; and
   pushing a service object with a distance satisfying a predetermined condition as a response to the service request.

7. A non-transitory, computer-readable medium storing one or more instructions executable by a computer system to perform operations comprising:
   determining, based on a requesting location in a service request, a level-1 region that the service request belongs to, wherein the level-1 region is one of a first plurality of level-1 regions into which an area is divided based on a predetermined size in longitude and latitude;
   dividing the level-1 region into a second plurality of level-2 regions based on predetermined granularity, wherein the predetermined granularity is set to a predetermined geographical distance, and wherein the second plurality of level-2 regions are of a same size;
   determining, based on the requesting location, a level-2 region that the service request belongs to;
   determining a third plurality of adjacent level-2 regions that are adjacent to the level-2 region that the service request belongs to; and
   responding to the service request based on location information of all service objects in the level-2 region that the service request belongs to and on location information of all service objects in the third plurality of adjacent level-2 regions.

8. The non-transitory, computer-readable medium according to claim 7, wherein the dividing the level-1 region into a second plurality of level-2 regions based on predetermined granularity comprises:
   determining a reference location in the level-1 region in units of longitude and latitude, wherein the reference location is a corner of the level-1 region;
   determining an offset location that results from shifting the reference location of the level-1 region in directions of longitude and latitude into an interior of the level-1 region by a same granularity, and obtaining offset coordinate information in units of longitude and latitude of the offset location;
   calculating a change value between reference coordinate information of the reference location and the offset coordinate information, wherein the change value is a difference between latitude and longitude coordinate values of the reference location and latitude and longitude coordinate values of the offset coordinate information;
   determining a size of the level-2 region based on the change value; and
   dividing, based on the size of the level-2 region, the level-1 region that the service request belongs to into the second plurality of level-2 regions.

9. The non-transitory, computer-readable medium according to claim 7, wherein a sum of each size of the level-2 region obtained through division is equal to a size of the level-1 region.

10. The non-transitory, computer-readable medium according to claim 8, wherein calculating the change value between the reference coordinate information of the reference location and the offset coordinate information comprises:
    calculating a longitude difference x between the reference location and the offset location, and
    calculating a latitude difference y between the reference location and the offset location;
    and wherein determining a size of the level-2 region comprises determining a length of the level-2 region to be equal to x and a width of the level-2 region to be equal to y.

11. The non-transitory, computer-readable medium according to claim 8, wherein the determining a reference location in the level-1 region comprises:
    when the level-1 region is in a northern hemisphere, determining a northeast corner or a northwest corner of the level-1 region as the reference location; or
    when the level-1 region is in a southern hemisphere, determining a southeast corner or a southwest corner of the level-1 region as the reference location.

12. The non-transitory, computer-readable medium according to claim 7, wherein the responding to the service request based on location information of all service objects in the level-2 region that the service request belongs to and an adjacent level-2 region comprises:
    obtaining the location information of all the service objects in the level-2 region that the service request belongs to and the location information of all service objects in the third plurality of adjacent level-2 regions;
    calculating a distance between each service object and the requesting location based on the location information of the service object; and
    pushing a service object with a distance satisfying a predetermined condition as a response to the service request.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    determining, based on a requesting location in a service request, a level-1 region that the service request belongs to, wherein the level-1 region is one of a first plurality of level-1 regions into which an area is divided based on a predetermined size in longitude and latitude;
    dividing the level-1 region into a second plurality of level-2 regions based on a predetermined granularity, wherein the predetermined granularity is set to a predetermined geographical distance, and wherein the second plurality of level-2 regions are of a same size;
    determining, based on the requesting location, a level-2 region that the service request belongs to;
    determining a third plurality of adjacent level-2 regions that are adjacent to the level-2 region that the service request belongs to; and responding to the service request based on location information of all service objects in the level-2 region that the service request belongs to and on location information of all service objects in the third plurality of adjacent level-2 regions.

14. The computer-implemented system according to claim 13, wherein the dividing the level-1 region into a second plurality of level-2 regions based on predetermined granularity comprises:
determining a reference location in the level-1 region in units of longitude and latitude, wherein the reference location is a corner of the level-1 region;
determining an offset location that results from shifting the reference location of the level-1 region in directions of longitude and latitude into an interior of the level-1 region by a same granularity, and obtaining offset coordinate information in units of longitude and latitude of the offset location;
calculating a change value between reference coordinate information of the reference location and the offset coordinate information, wherein the change value is a difference between latitude and longitude coordinate values of the reference location and latitude and longitude coordinate values of the offset coordinate information;
determining a size of the level-2 region based on the change value; and
dividing, based on the size of the level-2 region, the level-1 region that the service request belongs to into the second plurality of level-2 regions.

15. The computer-implemented system according to claim 13, wherein a sum of each size of the level-2 region obtained through division is equal to a size of the level-1 region.

16. The computer-implemented system according to claim 14, wherein calculating the change value between the reference coordinate information of the reference location and the offset coordinate information comprises:
calculating a longitude difference x between the reference location and the offset location, and
calculating a latitude difference y between the reference location and the offset location;
and wherein determining a size of the level-2 region comprises determining a length of the level-2 region to be equal to x and a width of the level-2 region to be equal to y.

17. The computer-implemented system according to claim 14, wherein the determining a reference location in the level-1 region comprises:
when the level-1 region is in a northern hemisphere, determining a northeast corner or a northwest corner of the level-1 region as the reference location; or
when the level-1 region is in a southern hemisphere, determining a southeast corner or a southwest corner of the level-1 region as the reference location.

18. The computer-implemented system according to claim 13, wherein the responding to the service request based on location information of all service objects in the level-2 region that the service request belongs to and an adjacent level-2 region comprises:
obtaining the location information of all the service objects in the level-2 region that the service request belongs to and the location information of all service objects in the third plurality of adjacent level-2 regions;
calculating a distance between each service object and the requesting location based on the location information of the service object; and
pushing a service object with a distance satisfying a predetermined condition as a response to the service request.

19. The method according to claim 1, wherein a number of level-2 regions in the third plurality of adjacent level-2 regions is eight.

* * * * *